United States Patent Office 2,734,922
Patented Feb. 14, 1956

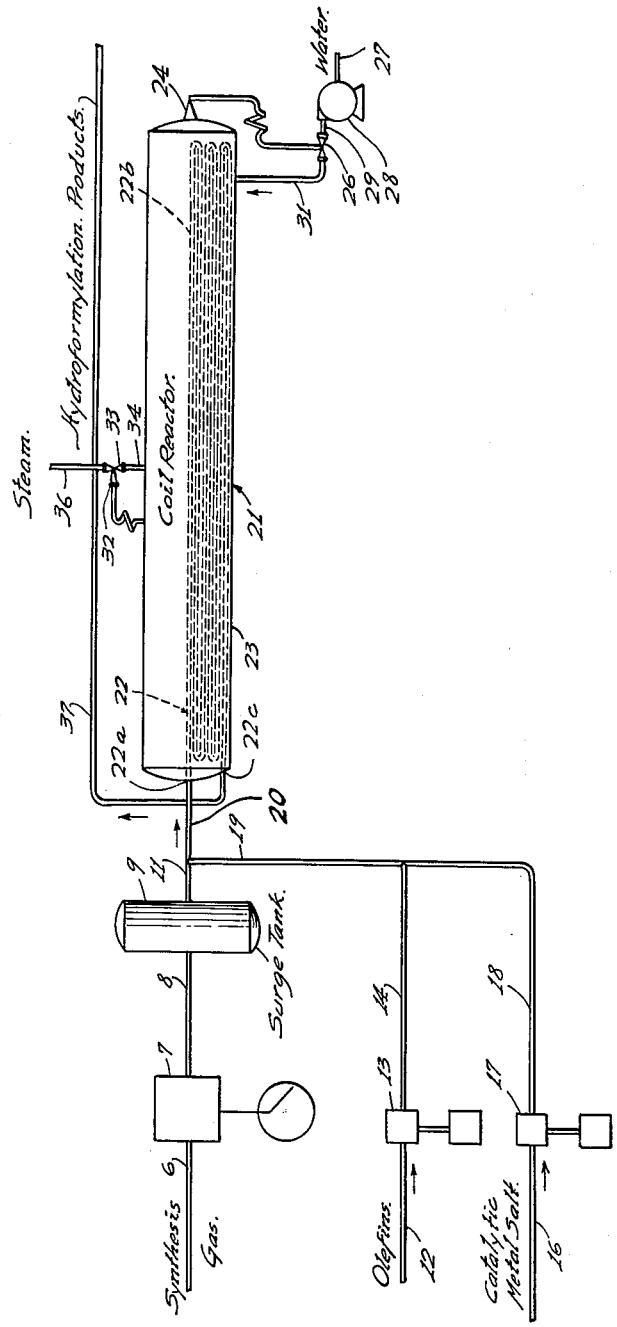

2,734,922

HYDROFORMYLATION OF OLEFINS

Bernard H. Gwynn, Tarentum, and Joel H. Hirsch, Oakmont, Pa., assignors to Gulf Research & Development Company, Pittsburgh, Pa., a corporation of Delaware Application May 25, 1950, Serial No. 164,211

6 Claims. (Cl. 260—604)

This invention relates to a process for carrying out reactions by which hydrogen and carbon monoxide are added to organic compounds and, more particularly, to an improved process for continuously hydroformylating olefins.

The addition of one hydrogen atom to a carbon atom joined to another by a double bond in an olefin and the addition of a formyl group to the other carbon atom, or the hydroformylation of olefins, has also been called carbonylation or oxonation. It has been the subject of research for a long period of time and is still being extensively studied. In the hydroformylation stage of the oxo process, for example, it has been proposed to hydroformylate olefins in the presence of a Fischer-Tropsch catalyst by reacting the olefins with hydrogen and carbon monoxide at an advanced pressure such as a pressure in the range of 750 to 10,000 pounds per square inch, and at a temperature in the neighborhood of 100° to 600° F. The predominant hydroformylation reactions which occur are those resulting in the production of aldehydes. As an example,

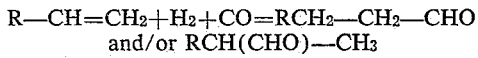

and/or RCH(CHO)—CH₃ where R is an organic radical. Other reactions producing alcohols, aldols, and the like, also occur.

In the past, difficulties have been encountered in carrying out the hydroformylation of olefins because the reactants must first be raised to a temperature at which hydroformylation occurs at a reasonable rate. When such a rate is obtained, however, it is necessary to remove a large amount of heat to control the reaction because the hydroformylation reaction is very exothermic. In addition, a rather long reaction period is needed to obtain satisfactory yields. Reaction periods of from 10 to 120 minutes have been suggested.

The present invention is concerned with a continuous process for the hydroformylation of olefins, which is adapted to produce good yields of the desired products and which can be carried out efficiently in relatively simple equipment. The process is characterized by controlled temperature conditions and by ease of operation.

The process is carried out in an elongated tubular reaction zone which is maintained in indirect heat exchange relationship with a heat transfer medium. A mixture consisting essentially of hydrogen and carbon monoxide in a mol ratio of from 0.5:1 to 8:1, and preferably from 1:1 to 3:1, an olefin or mixture of olefins, preferably containing at least 4 carbon atoms, and a salt of a catalytic metal, such as iron or cobalt, soluble in the olefin charge, is flowed through the reaction zone under selected turbulent flow conditions such that efficient temperature control is accomplished and undesirable catalyst deposition is avoided. We have found if good yields, adequate throughput, desired residence time, close temperature control, and avoidance of undesirable catalyst deposition are to be obtained, it is essential to employ an elongated tubular reaction zone such as described more in detail below, and to flow the mixture through the zone at a minimum linear velocity of 1 foot per second under conditions representing a Reynolds number of at least about 11,000.

Any suitable hydroformylation pressure can be employed, but we prefer to carry out the process at a pressure in the range of about 1500 to 4500 pounds per square inch. In general the process can be carried out at selected hydroformylation temperatures within the range of about 260° to 460° F. However, the temperature in any given case must be controlled within a range of about 20° F., selected to produce good yields under the pressure and other existing operating conditions.

The composition of the mixture introduced to the elongated tubular reaction zone in indirect heat exchange relationship with the heat transfer medium can be varied within wide ranges. The hydrogen to carbon monoxide mol ratio can vary from 0.5:1 to 8:1, but in general preferred results are obtained with a mol ratio in the range of from 1:1 to 3:1. Within this range the mixture of gases or synthesis gas can be economically produced and at the same time the gases discharged from the hydroformylation unit can be readily recycled without the necessity of greatly adjusting the composition of the gases.

Any olefin or mixture of olefins can be employed, but preferred results from a commercial viewpoint are obtained when the olefins contain at least 4 carbon atoms, and especially preferred results are obtained when the olefins contain 4 to 16 carbon atoms. Examples of suitable olefins, which can be single compounds or mixtures of compounds, are hexenes, heptenes, octenes such as diisobutylenes, triisobutylenes, and tetraisobutylenes. A mixture of olefins can contain both 1- and 2-olefins. In general, it is necessary in the reaction zone for the 2-olefins to be first converted to 1-olefins before they can undergo the hydroformylation reaction. Because of this, the necessary residence time is shorter with 1-olefins than with 2-olefins. However, by adjusting reaction conditions, any mixture of 1-olefins, 2-olefins, or of 1- and 2-olefins can be efficiently hydroformylated. A residence period of from 10 to 30 minutes gives preferred results.

As stated above, the charge mixture comprises a salt of a catalytic metal such as iron or cobalt which under the conditions of the process is soluble in the olefin charge. The catalytic metal is readily introduced in this manner, the salt is rapidly converted to an active form, and by proceeding in this way it is not necessary to introduce the catalytic metal dissolved in a solvent or any extraneous material which must subsequently be separated from the products of hydroformylation and discarded or repurified and recycled. In addition, as will be described in detail below, the conditions of operation in accordance with our invention are such that undesirable catalyst deposition is avoided in the absence of any additional solvent.

Although preferred results are obtained with iron or cobalt salts, especially preferred results are obtained with cobalt salts, and for this reason the following description will largely be concerned with a process in which the catalytic metal is cobalt. Preferred results are obtained with cobalt naphthenate, or the cobalt salts of higher aliphatic acids such as 2-ethyl hexanoic acid, lauric, palmitic, and stearic acids. These compounds are not poisonous and can readily be produced and stored.

In accordance with our invention when a mixture such as the one described is passed through an elongated tubular reaction zone in indirect heat exchange relationship with a heat transfer medium, the flow conditions are selected so that efficient temperature control is accomplished, and undesirable catalyst deposition is avoided. We have found that in order to achieve this, the linear velocity must be at least 1 foot per second and the Reynolds number must be at least about 11,000. The flow conditions characteristic of the minimum Reynolds number are required not only to provide the minimum heat transfer which is necessary to obtain the degree of temperature control required but also to prevent undesirable deposition of the catalyst. The Reynolds number criterion is determined as pointed out, for example, in "Principles of Chemical Engineering" by Walker, Lewis, McAdams, and Gilliland, third edition, McGraw-Hill Book Company, Inc. See particularly page 82.

We have also found that in order to obtain the desired reaction and flow conditions, the tubular reaction zone should be elongated and should have an inside diameter of from 1 to 5 inches. We have found that a minimum diameter for the reaction zone is necessary because in reaction zones having diameters appreciably less than this minimum diameter, such as a laboratory unit having a reaction zone 0.125 inch in diameter, the throughput is too small for the unit to be used efficiently for commercial production of hydroformylation products. It is possible in a laboratory unit to employ a reactor with a reaction zone so small in diameter that turbulent flow cannot be obtained with a desired residence time. In such a reactor the flow is viscous and the problems of heat transfer are different from those in a larger commercial unit with a reasonable commercial throughput. We have found that it is important that the diameter not exceed 5 inches because when a reaction zone is used with a greater diameter, the temperature difference across the cross-section normal to the direction of flow is too large and the necessary temperature control cannot be obtained. With the other flow conditions as described, and with a diameter of from 1 to 5 inches, the temperature can be maintained within a range of 20° F., and undesirable catalyst deposition can be avoided.

The length of the elongated tubular reaction zone can be varied but it is necessary for it to be sufficiently long so that the desired residence time and minimum average linear velocity can be obtained. In order to obtain an average linear velocity of 1 foot per second, the coil reactor must be at least 600 feet long for a residence time of 10 minutes and at least 1800 feet for a residence time of 30 minutes. It is therefore necessary that the ratio of the length to diameter, or the elongation factor, be at least about 1440. The coil can be any desired length, above the minimum fixed as described but in general because of operating and economic considerations, preferred results are obtained when it does not exceed 6000 feet. The elongation factor for a 1 inch inside diameter coil, 6000 feet long, is 72,000.

When operating under the conditions disclosed, any suitable hydroformylation pressure can be employed but we prefer to carry out the process at a pressure in the range of about 1500 to 4500 pounds per square inch and especially in the range of from 3000 to 4500 pounds per square inch. The hydroformylation temperature can vary within the range of about 260° to 460° F. but, as pointed out above, in any given case the temperature should be controlled within a range of about 20 F. The temperature range selected will depend upon the catalyst and upon other reaction conditions. When the catalytic metal salt is a salt of cobalt, preferred results are obtained when the hydroformylation temperatures are selected from the range of about 260° to about 360° F. and particularly when the temperatures are selected from the especially preferred range of about 300° to about 340° F. When the catalytic metal salt is an iron salt, preferred results are obtained when the hydroformylation temperatures are selected from the range of about 360° to about 460° F.

As stated above, when operating with an average linear velocity of 1 foot per second, a Reynolds number of at least about 11,000, a diameter of from 1 to 5 inches, we have found that a mixture of olefins containing a salt of a catalytic metal can be passed through an elongated reaction zone under conditions such that the temperature is controlled within a range of about 20° F., undesirable deposition of the catalyst is avoided, and commercial amounts of products are obtained in good yields.

In a preferred embodiment of the invention, a coil type reactor immersed in a bath of boiling liquid such as water is employed for carrying out the process. The reactor can readily be made of sufficient length so that adequate reaction time can be obtained.

We have found that the length of the coil can be increased so that the coil is sufficiently long to contain a preheating zone and a hydroformylation zone. Such a reactor can be efficiently designed and fabricated to withstand hydroformylation pressures such as 4500 pounds per square inch or higher. Excellent heat transfer is obtained between fluids within the coil, and the liquid boiling outside the coil. This is true in the portion of the coil which is used for preheating, and the portion of the coil used for the reaction.

A method of carrying out an embodiment of our invention in which such a coil type reactor is employed will now be described in connection with the accompanying drawing. The single figure is a simplified flow sheet of a reactor system in accordance with the process of our invention.

Referring to the drawing, synthesis gas with a hydrogen to carbon monoxide ratio of about 1:1 is introduced at a rate of about 610,000 standard cubic feet per stream day by means of line 6 to the compressor 7. The gas is compressed to a pressure of about 1750 pounds per square inch at a temperature of about 350° F. The compressed gas is passed by means of line 8 to the surge tank 9, and is removed from the surge tank 9 by means of line 11. About 159 barrels (42 gallons per barrel) per stream day of heptenes are introduced by means of line 12 to pump 13, and are discharged from the pump at a pressure of about 1750 pounds per square inch and a temperature of about 90° F. by means of line 14. About 395 pounds per day of cobalt 2-ethyl hexanoate dissolved in sufficient solvent naphtha to form a liquid containing about 6 weight per cent cobalt as cobalt 2-ethyl hexanoate are introduced by means of line 16 to pump 17 and are discharged at a pressure of about 1750 pounds per square inch at a temperature of about 90° F. by means of line 18. The cobalt 2-ethyl hexanoate in line 18 and the olefins in line 14 are combined in line 19. The synthesis gas from line 11 and the cobalt 2-ethyl hexanoate dissolved in olefins in line 19 are combined in line 20 to form a mixture at a pressure of about 1750 pounds per square inch and a temperature of about 200° F. The mixture in mixed fluid phase formed of the synthesis gas containing the liquid olefins in which the cobalt salt is dissolved, is introduced into the coil reactor 21 at the beginning of the coil 22 at point 22a. The coil is made up of 3000 feet of three inch inside diameter tubing. It is maintained in a constant level of boiling water by means of liquid level controller 24 which actuates valve 26 and admits about 2300 gallons per stream day of water through line 27, pump 28, and line 29, to the valve 26, and then by line 31 to the coil reactor.

The temperature in the coil reactor is maintained at about 300° F. by adjusting the pressure control regulator 32 to operate valve 33 in the reactor discharge line 34 at about 52 pounds per square inch gauge pressure. Under these conditions about 19,000 pounds per stream day of steam are discharged through line 36.

The mixture of reactants introduced into the coil reactor is heated in the first or preheating portion of the coil 22 which extends in this case about 300 feet from the beginning of the coil at 22a to the end of the preheating section at 22b. As soon as the mixture has been heated to a temperature of about 300° F., and the desired cobalt catalyst has been prepared dissolved in the olefins in mixed fluid phase, the hydroformylation reaction occurs in the reaction portion of the coil which extends from the end of the preheating section at 22b to the end of the coil at 22c. The products are removed from the coil by means of line 37 at a temperature of about 310° F., and a pressure of about 1740 pounds per square inch. Under these conditions the linear velocity is about 5 feet per second, the residence time is about 10 minutes, and the Reynolds number is about 258,000. The products in a stream day comprise about 27,100 pounds of $C_9$ aldehydes and about 3,100 pounds of high boiling materials; and the unconverted reactants comprise in addition to the catalyst about 15,300 pounds of heptene, about 15,350 pounds of carbon monoxide, and about 1,100 pounds of hydrogen.

The following example illustrates a method of carrying out an embodiment of our invention in which the total pressure and the hydrogen to carbon monoxide ratio are increased while the partial pressure of carbon monoxide is maintained at about 875 pounds per square inch in a coil type reactor system similar to the one previously disclosed but having somewhat different dimensions. Because the systems are similar the same figure is used.

Referring to the drawing, in a stream day about 580,000 standard cubic feet of synthesis gas with a hydrogen to carbon monoxide ratio of about 3:1, about 107 barrels of diisobutylene comprising 84 per cent of 1-diisobutylene (2,4,4-trimethylpentene-1) and 16 per cent of 2-diisobutylene (2,4,4-trimethylpentene-2), and about 470 pounds of cobalt naphthenate which has an average molecular weight of about 632 and is dissolved in sufficient solvent naphtha to form a liquid containing about 6 weight per cent cobalt as cobalt naphthenate, are introduced by lines 6, 12, and 16, respectively. Each of the reactants is compressed to a pressure of about 3500 pounds per square inch, the synthesis gas being at a temperature of about 350° F., the olefins and cobalt solution being at a temperature of about 90° F. The reactants in lines 11, 14, and 18, respectively, are combined in line 20 to form a mixture at a pressure of about 3500 pounds per square inch and at a temperature of about 200° F. The mixture in mixed fluid phase formed of the synthesis gas containing the liquid olefins and the dissolved cobalt naphthenate is introduced into the coil reactor 21 at the beginning of the coil 22 at point 22a. The coil in this case is made up of 2500 feet of 3 inch inside diameter tubing. It is maintained as before in a constant level of boiling water and about 2050 gallons per stream day are admitted through line 27.

The temperature in the coil reactor is maintained at about 310° F., by adjusting the pressure control regulator 32 to operate valve 33 at a pressure of about 63 pounds per square inch gauge. Under these conditions, about 10,200 pounds per stream day of steam are discharged through line 36. The preheating portion of the coil 22 in this case is about 120 feet long. In this portion of the coil the reactants are heated to a temperature of about 300° F. and the cobalt naphthenate is converted to the desired cobalt catalyst which is produced dissolved in the olefins in mixed fluid phase, the hydroformylation reaction occurring in the remaining or reaction portion of the coil. The products are removed from the coil reactor at a temperature of about 310° F. and at a pressure of about 3490 pounds per square inch.

The linear velocity is about 4.17 feet per second, the residence time is about 10 minutes, and the Reynolds number is about 287,000. The liquid products comprise about 32,420 pounds per stream day, distributed as follows: about 22,000 pounds of $C_9$ aldehydes, about 5,070 pounds of high boiling materials, and about 5,350 pounds of diisobutylene.

As previously stated, although cobalt catalysts are preferred, other metal hydroformylation catalysts can be used. Iron catalysts are of especial interest because they readily form a carbonyl which is maintained in solution in the reaction mixture in a manner similar to cobalt carbonyl. It will be understood that the invention in its broad aspects is not limited to any particular hydroformylation pressures and temperatures as any of such conditions that have been employed in other hydroformylation processes can be employed in the present process. It is preferred, however, to employ pressures within the range of about 1500 to about 4500 pounds per square inch and particularly from 3000 to 4500 pounds per square inch and to employ temperatures within the range of about 260° to about 460° F., depending upon the catalyst employed and the residence time permitted in the available equipment. With any set of reaction conditions there is a preferred temperature range of about 20° F. In the present process, when a temperature range for operation has been selected, the reaction mixture throughout remains at a temperature within this range and variable reaction and deposition of catalyst are avoided. When operating the present process using a soluble cobalt salt and a minimum average linear velocity of 1 foot per second, and a minimum Reynolds number of about 11,000, the reaction temperatures should be selected from the range of about 260° to about 360° F. and preferably the range of about 300° to about 340° F. Because of the efficient temperature control characteristic of the process, the actual temperature range across any cross-section of the reaction mixture will be substantially the same throughout the linear extent of the reaction zone.

Obviously many modifications and variations of the invention, as hereinbefore set forth, can be made without departing from the spirit or scope thereof and therefore only such limitations should be imposed as are indicated in the appended claims.

We claim:

1. A process for the hydroformylation of olefins which comprises passing a reaction mixture comprising hydrogen, carbon monoxide, and a composition consisting essentially of olefins having dissolved therein a catalytic metal salt at a hydroformylation pressure and at selected hydroformylation temperatures through an elongated reaction zone having an inner diameter of from one to 5 inches and an elongation factor of at least about 1,440 in indirect heat exchange relationship with a heat transfer medium under flow conditions such that the residence period is about 10 to about 30 minutes, the linear velocity is at least one foot per second, the Reynolds number is at least about 11,000, and the selected hydroformylation temperatures are within a range of about 20° F. throughout the reaction zone, whereby undesirable deposition of the catalytic metal in the elongated reaction zone is avoided, and a good yield of the desired hydroformylation product is obtained.

2. A process for the hydroformylation of olefins which comprises passing a reaction mixture comprising hydrogen and carbon monoxide in a mol ratio of 0.5:1 to 8:1 and a composition consisting essentially of olefins having dissolved therein a cobalt salt soluble in said olefins at a hydroformylation pressure above about 1500 pounds per square inch and at selected hydroformylation temperatures in the range of about 260° to about 460° F. through an elongated reaction zone having an inner diameter of from one to 5 inches and an elongation factor of at least about 1,446 in indirect heat exchange relationship with a heat transfer medium under flow conditions such that the residence time is at least about ten minutes, the Reynolds number is at least about 11,000, the average linear velocity is at least one foot per second, and said selected hydroformylation temperatures are within a range of about 20° F. throughout the reaction zone, whereby undesirable deposition of the catalytic metal in the elongated reaction zone is avoided, and a good yield of the desired hydroformylation product is obtained.

3. A process for the hydroformylation of olefins which comprises passing a reaction mixture comprising hydrogen and carbon monoxide in a mol ratio of 1:1 to 3:1 and a composition consisting essentially of olefins having dissolved therein a cobalt salt, at a hydroformylation pressure of about 3,000 to 4,500 pounds per square inch, and at selected hydroformylation temperatures in the range of about 300° to about 340° F., through an elongated reaction zone having an inner diameter of from one to 5 inches and an elongation factor of about 1,440 to about 72,000 in indirect heat exchange relationship with a heat transfer medium under flow conditions such that the residence time is about 10 to about 30 minutes, the Reynolds number is at least about 11,000, the average linear velocity is about 1 to 10 feet per second, and said selected hydroformylation temperatures are within a range of about 20° F. throughout the reaction zone, whereby undesirable deposition of the catalytic metal in the elongated reaction zone is avoided, and a good yield of the desired hydroformylation product is obtained.

4. A process as defined in claim 3 wherein said cobalt salt is a cobalt salt of a higher aliphatic acid.

5. A process as defined in claim 4 wherein said higher aliphatic acid is 2-ethyl hexanoic acid.

6. A process as defined in claim 3 wherein said cobalt salt is cobalt naphthenate.

References Cited in the file of this patent

UNITED STATES PATENTS

| | | |
|---|---|---|
| 2,327,066 | Roelen | Aug. 17, 1943 |
| 2,351,793 | Voorhees | June 20, 1944 |
| 2,437,600 | Gresham et al. | Mar. 9, 1948 |
| 2,448,279 | Rubin | Aug. 31, 1948 |
| 2,464,916 | Adams et al. | Mar. 22, 1949 |
| 2,477,554 | McKeever | July 26, 1949 |
| 2,497,303 | Gresham et al. | Feb. 14, 1950 |
| 2,557,701 | Smith | June 19, 1951 |
| 2,564,130 | Schreyer | Aug. 14, 1951 |
| 2,571,160 | Parker et al. | Oct. 16, 1951 |

OTHER REFERENCES

"Oxo Process," Fiat Final Report #1000, Dec. 26, 1947, PB 81383, pages 16, 17 and 29.

I. G. Farben Patent Application I 74 142 IVd/120 Jan. 22, 1943. TOM Reel 36 deposited in Library of Congress April 18, 1946. Translated by Oscar Meyer in his book entitled "Oxo Process" pages 68–69 (1948).